(12) United States Patent
Freitag, Jr. et al.

(10) Patent No.: US 7,088,680 B1
(45) Date of Patent: Aug. 8, 2006

(54) SYSTEM AND METHOD FOR DIGITAL COMMUNICATION VIA A TIME DIVISION MULTIPLEXED SERIAL DATA STREAM

(75) Inventors: William W. Freitag, Jr., Austin, TX (US); Daniel B. Reents, Dripping Springs, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/228,445

(22) Filed: Jan. 11, 1999

(51) Int. Cl.
*H04J 3/14* (2006.01)

(52) U.S. Cl. ............................ 370/236; 370/522

(58) Field of Classification Search ............ 370/375, 370/236, 322, 324, 326, 341, 345–350, 466, 370/468, 477, 503, 508, 509, 360, 362, 363, 370/366, 368, 379, 395.4, 395.7, 433, 436–440, 370/401, 392, 413, 442–443, 458, 459, 461, 370/462, 510, 512, 484, 210, 490; 709/212; 710/72, 240
See application file for complete search history.

(56) References Cited

U.S. PATENT DOCUMENTS

| | | | | |
|---|---|---|---|---|
| 4,424,565 A | * | 1/1984 | Larson | 709/212 |
| 4,852,088 A | * | 7/1989 | Gulick et al. | 370/413 |
| 5,136,585 A | * | 8/1992 | Nizamuddin et al. | 370/271 |
| 5,151,896 A | * | 9/1992 | Bowman et al. | 370/401 |
| 5,455,907 A | * | 10/1995 | Hess et al. | 710/240 |
| 5,721,726 A | * | 2/1998 | Kurnick et al. | 370/236 |
| 5,970,069 A | * | 10/1999 | Kumar et al. | 370/401 |
| 5,991,817 A | * | 11/1999 | Rowett et al. | 370/392 |
| 6,118,758 A | * | 9/2000 | Marchok et al. | 370/490 |
| 6,237,054 B1 | * | 5/2001 | Freitag, Jr. | 710/72 |
| 6,249,527 B1 | * | 6/2001 | Verthein et al. | 370/466 |
| 6,266,715 B1 | * | 7/2001 | Loyer et al. | 709/212 |
| 6,327,259 B1 | * | 12/2001 | Chiu et al. | 370/375 |
| 6,333,940 B1 | * | 12/2001 | Baydar et al. | 370/509 |
| 6,493,352 B1 | * | 12/2002 | Mawhinney et al. | 370/458 |

* cited by examiner

*Primary Examiner*—Duc Ho
*Assistant Examiner*—Phuongchau Ba Nguyen
(74) *Attorney, Agent, or Firm*—Robert C. Kowert; Meyertons, Hood, Kivlin, Kowert & Goetzel, P.C.

(57) ABSTRACT

A system and method are presented for digital communication via a time division multiplexed serial data stream. A serial communication system according to the present invention includes a serial communication controller having a set of functional units each configured to perform a specific function of a serial communication protocol. The functional units are operably coupled in series in order to produce digital data according to the serial communication protocol. The set of functional units operates alternately upon an active one of the multiple serial data channels within the time division multiplexed serial data stream. Each functional unit may be a state machine including one or more programmable registers for storing state information which determines the operating state of the functional unit. An active channel transition from a first data channel to a second data channel may be accomplished by saving state information associated with the first data channel and "restoring" saved state information associated with the second data channel. A memory unit coupled to each functional unit may include a separate portion allocated to each of the multiple serial data channels. State information may be retrieved from the functional units and stored in the portion of the memory unit allocated to the first data channel. State information may then be retrieved from the portion of the memory unit allocated to the second data channel and stored within the memory elements of the functional units, thus accomplishing the state "restoring" activity.

15 Claims, 9 Drawing Sheets

| Opening Flag Field | Address Field | Control Field | Information Field | Frame Check Sequencing Field | Closing Flag Field |
|---|---|---|---|---|---|
| 01111110 | 8 bits | 8 bits | 8*n bits | 16/32 bits | 01111110 |

*FIG. 4*

SYSTEM AND METHOD FOR DIGITAL COMMUNICATION VIA A TIME DIVISION MULTIPLEXED SERIAL DATA STREAM

BACKGROUND OF THE INVENTION

1. Field of the Invention

This invention relates to digital communication systems, and more particularly to serial data communication systems employing time division multiplexing to combine several different serial data channels into single serial data streams.

2. Description of the Relevant Art

A transmission medium carries signal-encoded information (i.e., data) from one point to another. Common types of transmission media include metal wires for carrying electrical signals, fiber-optic cables for conveying light signals, and air through which electromagnetic signals (e.g., light and radio waves) travel. As digital signals are more immune to degradations suffered along transmission media, data is often transmitted over transmission media in digital form. For example, telephone service providers typically digitize analog speech signals before conveying the speech signals over relatively long lengths of transmission media. Each telephone conversation may be represented by a serial stream of binary digits (i.e., bits) having a beginning and an end, generally constituting a data "channel."

A given transmission medium may be able to handle the transmission of several different data channels at the same time (e.g., several different telephone conversations occurring simultaneously). In this case, each data channel may be assigned a periodically recurring block of time (i.e., a "time slot") for transmission of digital data upon the transmission medium. A transmitting digital communication system may combine the digital data of several individual data channels into a single serial data stream using TDM, then transmit the serial data stream upon the transmission medium. A receiving digital communication system may receive the serial data stream via the transmission medium and separate the data of the individual data channels, thus reforming the individual data channels.

In order to allow the detection of possible errors occurring during transmission of the channel data via the transmission medium, the data of each individual data channel is typically divided into discrete units called "frames." Error control information is derived from the framed data, and is transmitted along with the framed data. The error control information allows for the detection and/or correction of transmission errors. A transmitting digital communication system encapsulates channel data into frames, generates the error control information associated with the frames, incorporates the error control information into the frames, and transmits the frames upon the transmission medium. A receiving digital communication system receives the framed data from the transmission medium, extracts the error control information from the frames, checks the framed data for errors, and reassembles the channel data from the framed data. All of the above actions are performed according to a selected communication protocol.

There are numerous protocols currently being used for conveying serial data streams upon a transmission medium, including T1, E1, and the high-level data link control (HDLC) protocol. Each serial data communication protocol achieves data transmission in a different way, and digital communication system hardware and/or software designed to implement one serial data communication protocol will typically not recognize data transmitted using another serial data communication protocol. In addition, new serial data communication protocols are continuously being developed in an effort to increase the rates and reliabilities of digital data transfers.

A microcontroller is an integrated circuit which incorporates a processor core along with one or more support circuits on the same monolithic semiconductor substrate (i.e., chip). The support circuits perform support functions such as communication functions and memory interface functions. Systems which employ microcontrollers are typically implemented using fewer separate semiconductor devices. Advantages of such systems include shortened design times, lower fabrication costs, and higher reliabilities. Microcontrollers find applications in industrial and commercial products including control systems, computer terminals, hand-held communications devices (e.g., cellular telephones), network interface equipment, photocopier machines, facsimile machines, and hard disk drives.

It would be beneficial to have a digital communication system capable of transmitting and receiving serial data using time division multiplexing and organized in a functional manner such that the digital communication system may be easily configurable and/or modifiable to convey the serial data via any serial data protocol.

SUMMARY OF THE INVENTION

A system and method are presented for digital communication via a time division multiplexed serial data stream. A serial communication system in accordance with the present invention includes a serial communication controller having a set of functional units each configured to perform a specific function of a serial communication protocol. The functional units are operably coupled in series in order to produce digital data according to the serial communication protocol. The set of functional units operates alternately upon multiple serial data channels within the time division multiplexed serial data stream.

Each serial data channel within the serial data stream is assigned a periodically recurring segment of time (i.e., "time slot") and is active during its assigned time slot. The functional units operate upon the active serial data channel. In one embodiment, each functional unit is a state machine having a set of unique operating states. Each functional unit includes a set of read/write (i.e., programmable) memory elements (e.g., one or more registers) for storing state information which determines the operating state of the functional unit.

When the active serial data channel changes from a first data channel to a second data channel, a switch in processing from the first data channel to the second data channel is accomplished by saving state information associated with the first data channel and "restoring" saved state information associated with the second data channel. A memory unit may be operably coupled to each of the functional units which includes a separate portion allocated to each of the multiple serial data channels. State information may be retrieved from the functional units and stored in the portion of the memory unit allocated to the first data channel. State information may then be retrieved from the portion of the memory unit allocated to the second data channel and stored within the memory elements of the functional units, thus accomplishing the state "restoring" activity. Processing of the digital data associated with the second serial data channel may then proceed.

The serial communication controller may include a microcontroller which performs the saving and restoring of the state information during active data channel transitions. The microcontroller may be coupled to the each of the functional units and to the memory unit, and may be configured to transfer state information between the functional units and the memory unit such the functional units operate alternately upon the portions of the multiple serial data channels within the serial data stream.

The serial communication controller may also include a time slot assigner group which keeps track of the active serial data channel. The time slot assigner group may include a register which stores a value indicating which serial data channel is active. The microcontroller may read the register in order to determine which serial data channel is active. Alternately, the time slot assigner group may produce an output signal indicating which serial data channel is active, and the microcontroller may be coupled to receive the output signal.

In one embodiment, the serial communication controller includes the set of functional units, the memory unit, the microcontroller, and the time slot assigner group, all of which are formed upon a single monolithic semiconductor substrate.

A method for transmitting and receiving the serial data stream includes providing the set of functional units described above, and transferring state information between the set of functional units and a memory unit such that the set of functional units operates alternately upon the portions of the multiple serial data channels. The transferring may include determining a change in an active serial data channel from a first serial data channel to a second data channel, and responding to the change by: (i) retrieving the state information within each functional unit, (ii) storing the retrieved state information within in a portion of the memory unit allocated to the first data channel, (iii) retrieving state information from a portion of the memory unit allocated to the second data channel, and (iv) storing the retrieved state information within each functional unit. The determining may include synchronizing clocking circuitry (e.g., within the time slot assigner group) to the periodically recurring portions of the multiple serial data channels.

In addition to the serial communication controller, the serial communication system may also include an interface unit and a timing recovery unit. The interface unit may be adapted for coupling to the transmission medium. The interface unit may be configured to receive a serial data stream from the transmission medium, wherein the receive serial data stream includes alternating portions of multiple serial data channels. The timing recovery unit may receive the receive serial data stream from the interface unit, and may produce a clock signal derived from the receive serial data stream. The serial communication controller may receive the receive serial data stream and the clock signal, and may extract data from the receive serial data stream using the clock signal. The serial communication controller may also produce a transmit serial data stream including alternating portions of multiple serial data channels. The interface unit may receive the transmit serial data stream and drive the transmit serial data stream upon the transmission medium. The serial communication controller may also be adapted for coupling to a host processor.

BRIEF DESCRIPTION OF THE DRAWINGS

Other objects and advantages of the invention will become apparent upon reading the following detailed description and upon reference to the accompanying drawings in which:

FIG. 4 is a block diagram of serial data framed in accordance with the HDLC communication protocol, wherein the HDLC data frame includes an opening flag field, an address field, a control field, an information field, a frame check sequencing (FCS) field, and a closing flag field;

Figure 1:
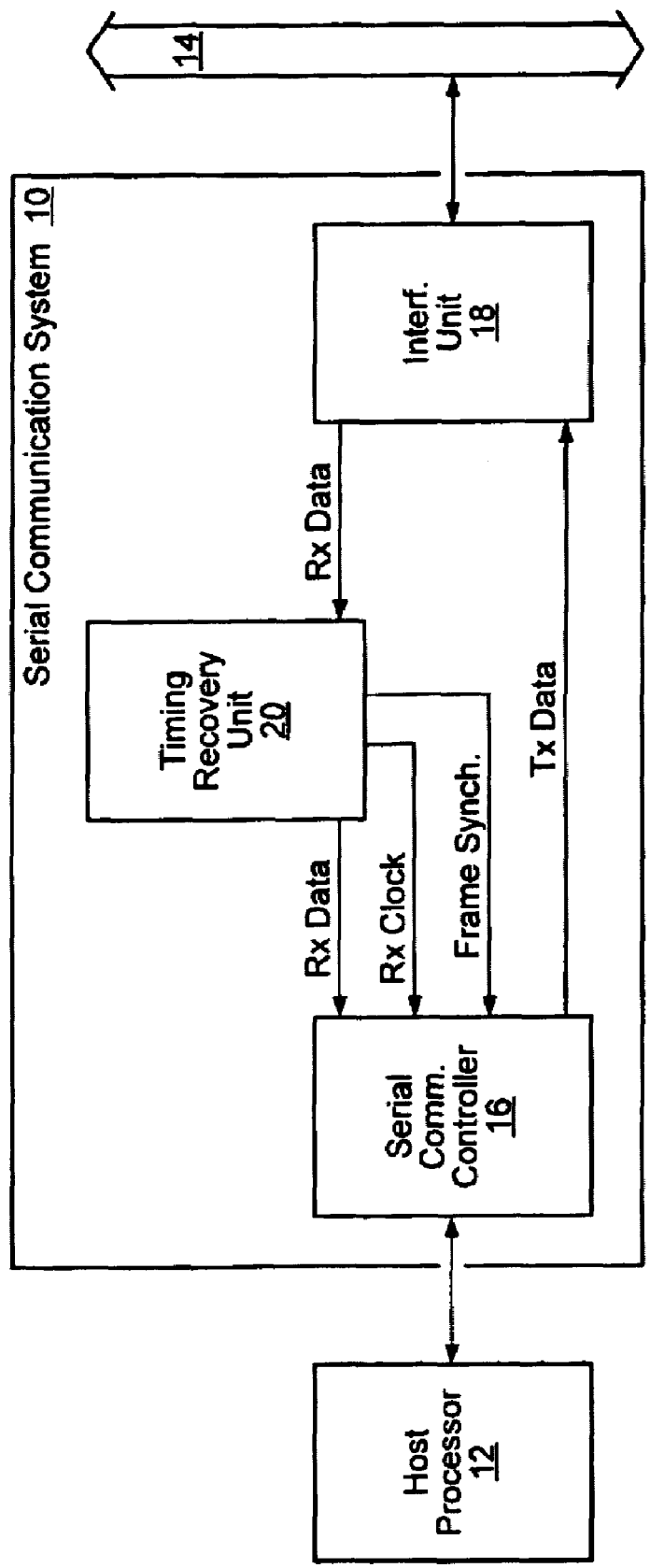
FIG. 1 is a block diagram of a serial communication system in accordance with the present invention, wherein the serial communication system is configured to transmit and receive a serial data stream including alternating portions of multiple serial data channels, and wherein each serial data channel is assigned a periodically recurring segment of time (i.e., "time slot"), and wherein the serial communication system is coupled between a host processor and a transmission medium, and wherein the serial communication system includes a serial communication controller coupled to the host computer, an interface unit coupled between the serial communication controller and the transmission medium, and a timing recovery unit coupled between the serial communication controller and the interface unit.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Referring now to FIG. 1, a block diagram of a serial communication system 10 in accordance with the present invention is shown coupled between a host processor 12 and a transmission medium 14. Serial communication system 10 transmits and receives a time division multiplexed serial data stream via transmission medium 14. The time division multiplexed serial data stream includes alternating portions of multiple serial data channels, and includes digital data of only one of the multiple serial data channels at any given time. Each serial data channel is a serial stream of bits having a beginning and an end. Host processor 12 configures serial communication system 10 for operation, provides digital data to serial communication system 10 for transmission upon transmission medium 14, and reads digital data from communication system 10 which has been received via transmission medium 14. Transmission medium 14 may be, for example, one or more metal wires (e.g., a coaxial cable or a twisted-pair cable), a fiber-optic cable, or air through which an electromagnetic signal (e.g. light or radio waves) is transmitted.

Serial communication system 10 includes a serial communication controller 16 coupled to host computer 12, an interface unit 18 coupled between serial communication controller 16 and transmission medium 14, and a timing recovery unit 20 coupled between serial communication controller 16 and interface unit 18.

Interface unit 18 is configured to receive the time division multiplexed serial data stream from transmission medium 14 and to provide a time division multiplexed "Rx Data" serial data stream containing the identical information to timing recovery unit 20. Both serial data streams include alternating portions of multiple serial data channels in periodically recurring "time slots." (See FIG. 2). Interface unit 18 is also configured to receive a "Tx Data" time division multiplexed serial data stream from serial communication controller 16 and to drive the "Tx Data" serial data stream upon transmission medium 14. For example, where transmission medium 14 includes at least one wire, interface unit 18 may generate and drive voltage or current signals representing the "Tx Data" serial data stream upon transmission medium 14. Where transmission medium 14 is a fiber-optic cable, interface unit 18 may generate and drive light signals representing the "Tx Data" serial data stream upon transmission medium 14.

Timing recovery unit 20 receives the "Rx Data" serial data stream produced by interface unit 18 and regenerates an "Rx Clock" signal used to transmit the serial data stream. Timing recovery unit 20 may include, for example, a phase-locked loop timing circuit which synchronizes an "Rx Clock" output to transitions in the "Rx Data" serial data stream. Timing recovery unit 20 may also include logic to detect frame synchronization signals within the "Rx Data" serial data stream. A frame synchronization bit or defined sequence of bits may be used to separate framed channel data. When such a frame synchronization signal is detected, timing recovery unit 20 may assert an output "Frame Synch" signal.

In a receive mode, serial communication controller 16 receives the "Rx Data" serial data stream, converts the digital data from serial format to parallel form, regroups or sorts (i.e., demultiplexes) the data frames of the serial data channels, stores the data within an internal memory unit, and notifies host computer 12 when channel data extracted from data frames is ready for retrieval and processing. In a transmit mode, serial communication controller 16 retrieves parallel data of one or more data channels from the internal memory unit, converts the digital data from parallel form to serial form, multiplexes the resulting serial data channels to form the "Tx Data" serial data stream, and provides the "Tx Data" serial data stream to interface unit 18.

Figure 2:
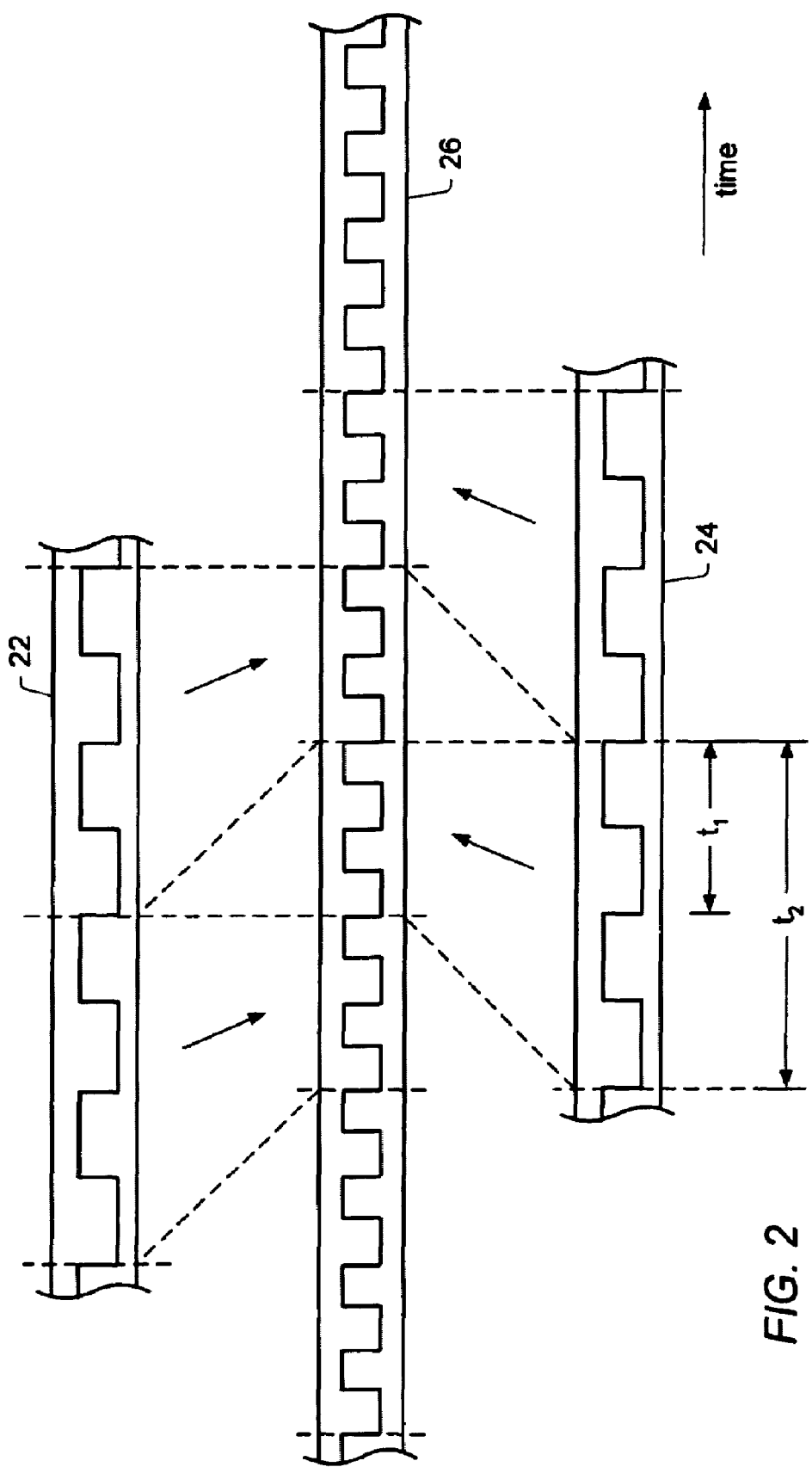
FIG. 2 is a diagram illustrating how two separate serial data channels may be divided into portions having fixed time lengths $t_1$, and the portions alternately combined using time division multiplexing to form a single serial data stream.

FIG. 2 is a diagram illustrating how two separate serial data channels 22 and 24 may be divided into portions having fixed time lengths, and the portions alternately combined using time division multiplexing to form a single serial data stream 26. Each serial data channel is assigned a periodically recurring time slot, and is "active" during its assigned time slot. A portion of the active serial data channel is transmitted upon transmission medium 14 during the assigned time slot.

In FIG. 2, the time period of each time slot is "$t_1$". As two separate serial data channels are combined to form serial data stream 26, the time periods "$t_2$" of the portions of the active serial data channels transmitted upon transmission medium 14 during the assigned time slots are equal to twice the time slot period $t_1$. Accordingly, the frequency of serial data stream 26 is twice that of serial data channels 22 and 24.

Figure 3:
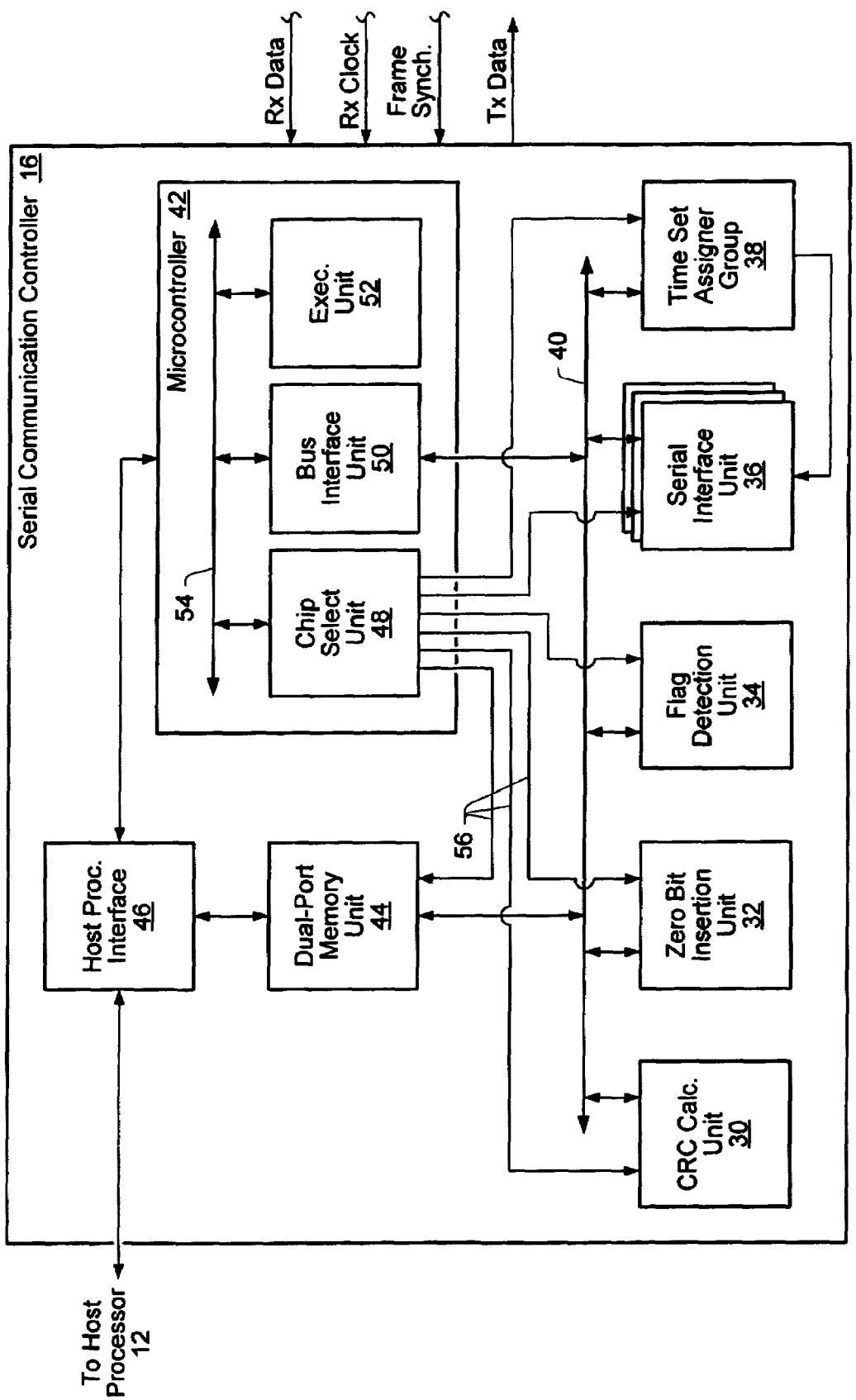
FIG. 3 is a block diagram of one embodiment of the serial communication controller of FIG. 1, wherein the serial communication controller includes a set of functional units each configured to perform a specific function of the high-level data link control (HDLC) communication protocol, and wherein the functional units include a cyclic redundancy check (CRC) calculation unit, a zero bit insertion unit, a flag detection unit, and a serial interface unit, and wherein the functional units are coupled to one another and to a microcontroller and a dual-port memory unit via a main bus, and wherein the serial communication controller also includes a time slot assigner group coupled to the main bus.

FIG. 3 is a block diagram of one embodiment of serial communication controller 16 for transmitting and receiving a serial data stream according to the HDLC protocol. Serial communication controller 16 includes a set of functional units which effect transmission and reception of a serial data stream according to the HDLC protocol. The set of functional units includes a cyclic redundancy check (CRC) calculation unit 30, a zero bit insertion unit 32, a flag detection unit 34, a serial interface unit 36, and a time slot assigner group 38 coupled to a main bus 40. The functional units are operably coupled in series such that the functional units operate upon the serial data stream in sequence.

Serial communication controller 16 also includes a microcontroller 42 and a dual-port memory unit 44 coupled to main bus 40, and a host processor interface 46 coupled between dual-port memory unit 44 and microcontroller 42. During use of serial communication controller 16, host processor interface 46 is coupled to host processor 12. Microcontroller 42 includes a chip select unit 48, a bus interface unit 50, and an execution unit 52 coupled to a core bus 54. The above elements of serial communication controller 16 are preferably formed upon a single monolithic semiconductor substrate.

In the embodiment described herein, small blocks of the serial data stream are transferred in parallel form (e.g., grouped into bytes or words) from one functional unit to the next (e.g., via interrupt signals and associated software). Alternately, dedicated signal lines of main bus 40 may be used to pass the serial data stream from one functional unit to the next in serial form during processing.

The function performed by each functional unit and the sequential ordering of the functional units are determined by the requirements of the serial data communication protocol (e.g., the HDLC protocol). It is noted that any other serial data communication protocol may be effected by partitioning the selected communication protocol into a number of functions to be performed in series, developing a functional unit to perform each of the identified functions, and operably coupling the functional units in series and in the proper order to produce a serial data stream according to the selected serial data communication protocol. Accordingly, the number of functional units present in other embodiments and configured to implement other serial data communication protocols (e.g., T1, E1, etc.) may vary. In any case, the functional units are always operably coupled in series in order to produce a serial data stream according to the selected serial data communication protocol.

As described above, each serial data channel within the time division multiplexed serial data stream is assigned a periodically recurring segment of time (i.e., "time slot"). Time slot assigner group 38 includes clocking logic which is synchronized to the periodically recurring time slots and keeps track of which of the serial data channels is active at any given time. The functional units process the digital data of the active serial data channel.

Dual-port memory unit 44 includes multiple memory locations for storing instructions and data. Each memory location preferably includes semiconductor random access memory (RAM) devices. Dual-port memory unit 44 supports simultaneous reads and writes (i.e., accesses) of the memory locations by microcontroller 42, and by host processor 12 via host processor interface 46. Host processor 12 directs the activities of (i.e., programs) serial communication controller 16 by storing selected instructions within dual-port memory unit 44. Execution unit 52 of microcontroller 42 includes circuitry to fetch instructions from dual-port memory unit 44 (via chip select unit 48 and bus interface unit 50) and to execute the instructions. Microcontroller 42 directs the operations of the elements of serial communication controller 16 according to the instructions stored within dual-port memory unit 44 by host processor 12.

Chip select unit 48 includes address decode logic, and is coupled to dual-port memory 44, CRC calculation unit 30, zero bit insertion unit 32, flag detection unit 34, serial interface unit 36, and time slot assigner group 38 by separate dedicated chips select signal lines 56. Each chip select signal line 56 carries a chip select signal generated by chip select unit 48.

In the embodiment of FIG. 3, microcontroller 42 uses chip select unit 48 and bus interface unit 50 to store data within (i.e., write data to) or retrieve (i.e., read) data from memory locations within dual-port memory unit 44 and addressable memory elements (e.g., registers) within the functional units and time slot assigner group 38. During instruction execution, execution unit 52 issues control signals which cause bus interface unit 50 to drive an address signal upon address lines of core bus 54 and upon address lines of main bus 40. Chip select unit 48 receives the address signal via core bus 54, decodes a portion (e.g., a high-ordered portion) of the address signal, and asserts a chip select signal corresponding to the decoded portion of the address signal. The chip select signal enables either the dual-port memory unit 44, one of the functional units, or time slot assigner group 38. The enabled dual-port memory unit 44, functional unit, or time slot assigner group 38 decodes a portion (e.g., a low-ordered portion) of the address signal upon address lines of main bus 40 in order to determine which memory location (dual-port memory unit 44) or register (functional unit or time slot assigner group 38) is being addressed. It is noted that in other embodiments the decode logic within dual-port memory unit 44, the functional units, and time slot assigner group 38 may decode the entire address signal, reducing the complexity of chip select unit 48 or making chip select unit 48 obsolete.

Host processor 12 stores data to be transmitted within dual-port memory 44 in parallel form. In a transmit mode, serial communication controller 16 retrieves the parallel data to be transmitted from dual-port memory unit 44, and serializes and frames the parallel data according to the HDLC communication protocol producing the "Tx Data" serial data stream. In a receive mode, serial communication controller 16 receives the "Rx Data" serial data stream, extracts framed data from the "Rx Data" serial data stream according to the HDLC protocol, converts the framed data to parallel form, and stores the resulting parallel data within dual-port memory unit 44. Host processor 12 reads the parallel data from dual-port memory unit 44.

Each functional unit may be, for example, a state machine having a set of unique operating states. Further, each functional unit may include logic devices permanently interconnected (i.e., "hardwired") to perform a specific function of a serial communication protocol (e.g., the HDLC protocol). Hardwired functional units are advantageously capable of faster operation than reconfigurable or programmable functional units. Each functional unit may include a set of addressable memory elements which may be read and written (e.g., programmable registers) for storing state information which determines the current operating state of the functional unit. Such programmable registers advantageously facilitate state saving and restoring involved in a preferred method of alternately processing the serial data channels of the time division multiplexed serial data stream.

In the transmit mode, serial interface unit 36 converts parallel data to serial form, producing the "Tx Data" serial data stream. In the receive mode, serial interface unit 36 converts the "Rx Data" serial data stream to parallel data. As indicated in FIG. 3, serial communication controller 16 may include multiple serial interface units 36 each operably coupled to a separate transmission medium.

FIG. 4 is a block diagram of serial data framed in accordance with the HDLC communication protocol. The HDLC data frame includes six fields: an opening flag field, an address field, a control field, an information field, a frame check sequencing (FCS) field, and a closing flag field. All HDLC frames begin and end with a flag sequence '01111110' duplicated in the opening and closing flag fields. The flag sequence is used for frame synchronization. The address field allows identification of the transmitting digital communication system (i.e., transmitter) and the receiving digital communication system (i.e., receiver) involved in the transmission. The control field contains the command, responses, and the sequence numbers used to maintain frame flow control. The information field contains the data to be transmitted from the transmitter to the receiver. The FCS field contains a cyclic redundancy check (CRC) value calculated by the transmitter. The CRC value represents redundant information about the frame which allows the receiver to detect errors in the frame. See, International Standard ISO/IEC 3309, "Information Technology—Telecommunications and Information Exchange Between Systems—High-Level Data Link Control (HDLC) Procedures—Frame Structure," 1993, ISO/IEC, available through the American National Standards Institute, NY.

Figure 5:
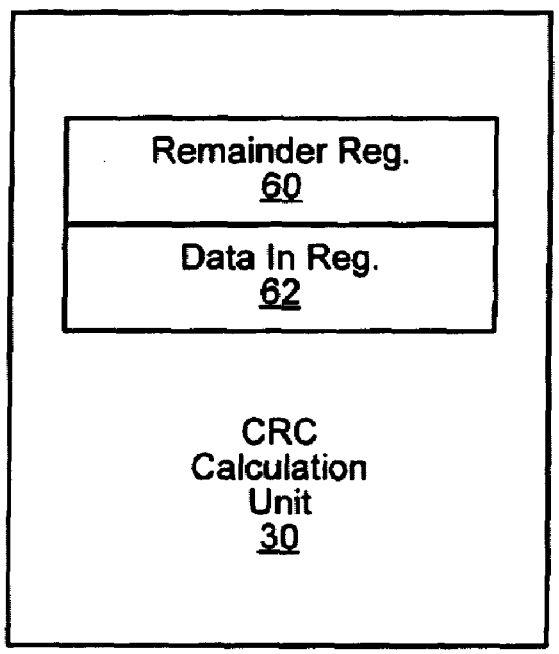
FIG. 5 is a block diagram of one embodiment of the CRC calculation unit of FIG. 3, wherein the CRC calculation unit is a state machine and includes programmable registers for storing state information, and wherein the state information determines the operational state of the CRC calculation unit.

FIG. 5 is a block diagram of one embodiment of CRC calculation unit 30 including a programmable remainder register 60 and a programmable "data in" register 62. CRC calculation unit 30 generates the bits of the FCS fields of HDLC frames, and includes logic to process a received serial data stream according to a CRC algorithm. CRC calculation unit 30 may include a hardware shift register with feedback elements (i.e., a linear feedback shift register). Remainder register 60 defines the current state of the state machine implementing CRC calculation unit 30, and may include the current values stored within the shift register cells. "Data in" register 62 stores a working portion of the serial data stream in parallel form.

In the transmit mode, microcontroller 42 reads data to be transmitted from dual-port memory unit 44 and provides the data in parallel form to CRC calculation unit 30. A serial data stream is thus transferred to CRC calculation unit 30 in parallel data units (e.g., bytes or words). In the receive mode, CRC calculation unit 30 is coupled to receive the serial data stream produced by zero bit insertion unit 32.

Figure 6:
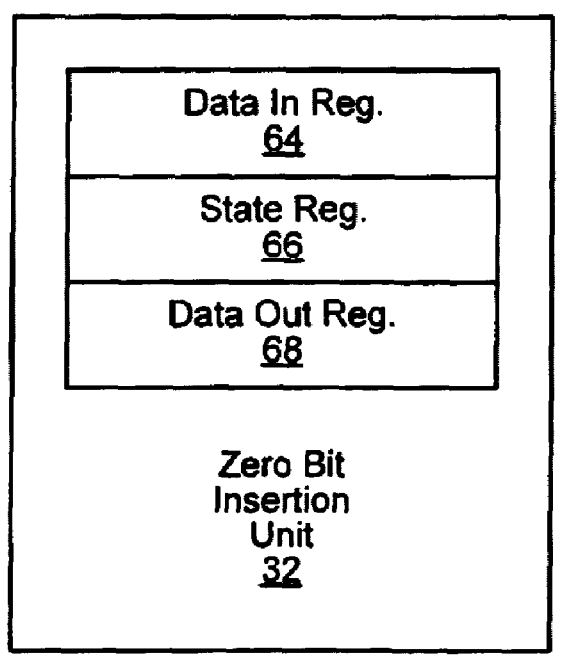
FIG. 6 is a block diagram of one embodiment of the zero bit insertion unit of FIG. 3, wherein the zero bit insertion unit is a state machine and includes programmable registers for storing state information, and wherein the state information determines the operational state of the zero bit insertion unit.

FIG. 6 is a block diagram of one embodiment of zero bit insertion unit 32 including a programmable "data in" register 64, state register 66, and "data out" register 68. In the transmit mode, zero bit insertion unit 32 is coupled to receive the serial data stream produced by CRC calculation unit 30. Zero bit insertion unit 32 examines the serial data stream and inserts a '0' bit after all sequences of five consecutive '1' bits in order to preclude the occurrence of the flag sequence '01111110' within the frame. In the receive mode, zero bit insertion unit 32 is coupled to receive the serial data stream produced by flag detection unit 34. Zero bit insertion unit 32 examines the serial data stream and deletes a '0' bit occurring after sequences of five consecutive '1' bits in order to restore the original bit sequence. "Data in" register 64 stores a working portion of the serial data stream in parallel form. State register 66 stores the current state of the state machine implementing zero bit insertion unit 32. "Data out" register 68 stores a portion of a resultant serial data stream produced by zero bit insertion unit 32 in parallel form. The portion of the resultant serial data stream saved by "data out" register 68 may be required for zero bit insertion unit 32 to perform correctly if the state information stored in state register 66 does not reveal how many consecutive '1' bits have been received.

Figure 7:
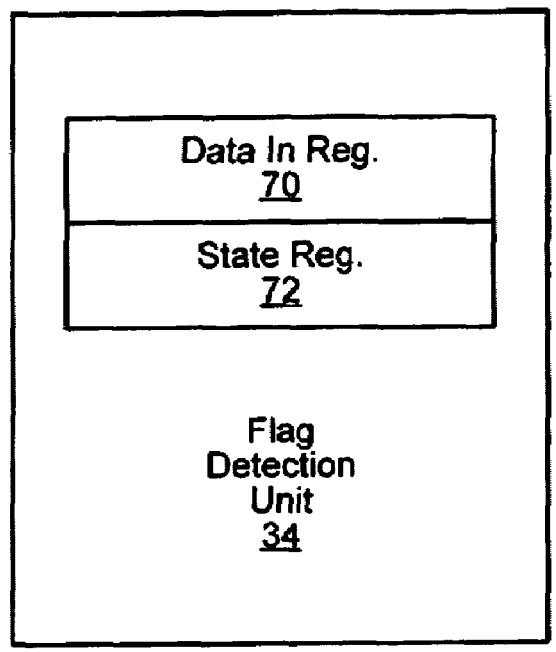
FIG. 7 is a block diagram of one embodiment of the flag detection unit of FIG. 3, wherein the flag detection unit is a state machine and includes programmable registers for storing state information, and wherein the state information determines the operational state of the flag detection unit.

FIG. 7 is a block diagram of one embodiment of flag detection unit 34 including a programmable "data in" register 70 and a programmable state register 72. In the transmit mode, flag detection unit 34 is coupled to receive the serial data stream produced by zero bit insertion unit 32. Flag detection unit 34 appends the flag sequence '01111110' to the beginning and to the end of the serial data stream, forming a complete HDLC data frame. In the receive mode, flag detection unit 34 is coupled to receive the serial data stream produced by serial interface unit 36. Flag detection unit 34 deletes the flag sequence '01111110' from the beginning and the end of the serial data stream as a step in deframing the channel data. Flag detection unit 34 may also send a signal to microcontroller 42 indicating reception of a complete HDLC data frame when a closing flag sequence is detected and deleted from the serial data stream. "Data in" register 70 stores a working portion of the serial data stream in parallel form. State register 72 stores the current state of the state machine implementing flag detection unit 34.

Figure 8:
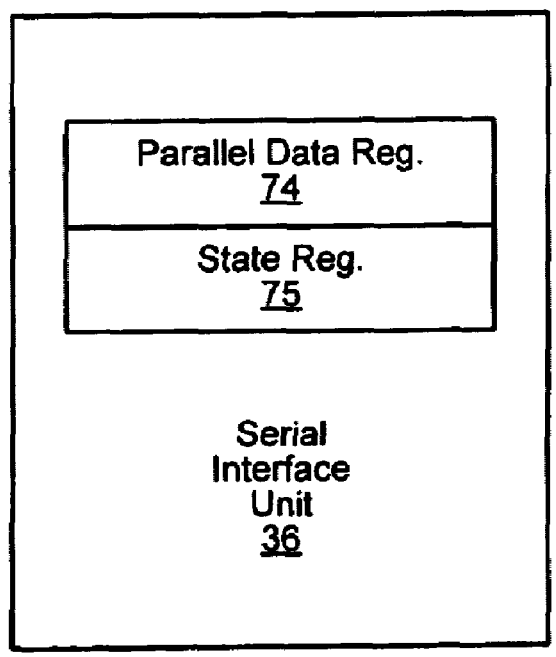
FIG. 8 is a block diagram of one embodiment of the serial interface unit of FIG. 3, wherein the serial interface unit is a state machine and includes programmable registers for storing state information, and wherein the state information determines the operational state of the serial interface unit.

FIG. 8 is a block diagram of one embodiment of serial interface unit 36 including a programmable parallel data register 74 and a programmable state register 75. Serial interface unit 36 may include one or more shift registers for performing serial-to-parallel conversions and parallel-to-serial conversions (i.e. converting data between parallel and serial forms). One of several shift registers may be dynamically assigned to a given serial data channel. State register 75 stores the current state of the state machine implementing serial interface unit 36. In the transmit mode, serial interface unit 36 is coupled to receive the serial data stream produced by flag detection unit 34. Serial interface unit 36 converts the parallel data representing the serial data stream to serial form, producing the "Tx Data" serial data stream. Parallel data register 74 stores a working portion of the input parallel data representing the serial data stream. In the receive mode, flag detection unit 34 is coupled to receive the "Rx Data" serial data stream. Serial interface unit 36 converts the "Rx Data" serial data stream to parallel form in units of, for example, bytes or words. Parallel data register 74 stores a working portion of the output parallel data derived from the input "Rx Data" serial data stream.

Figure 9:
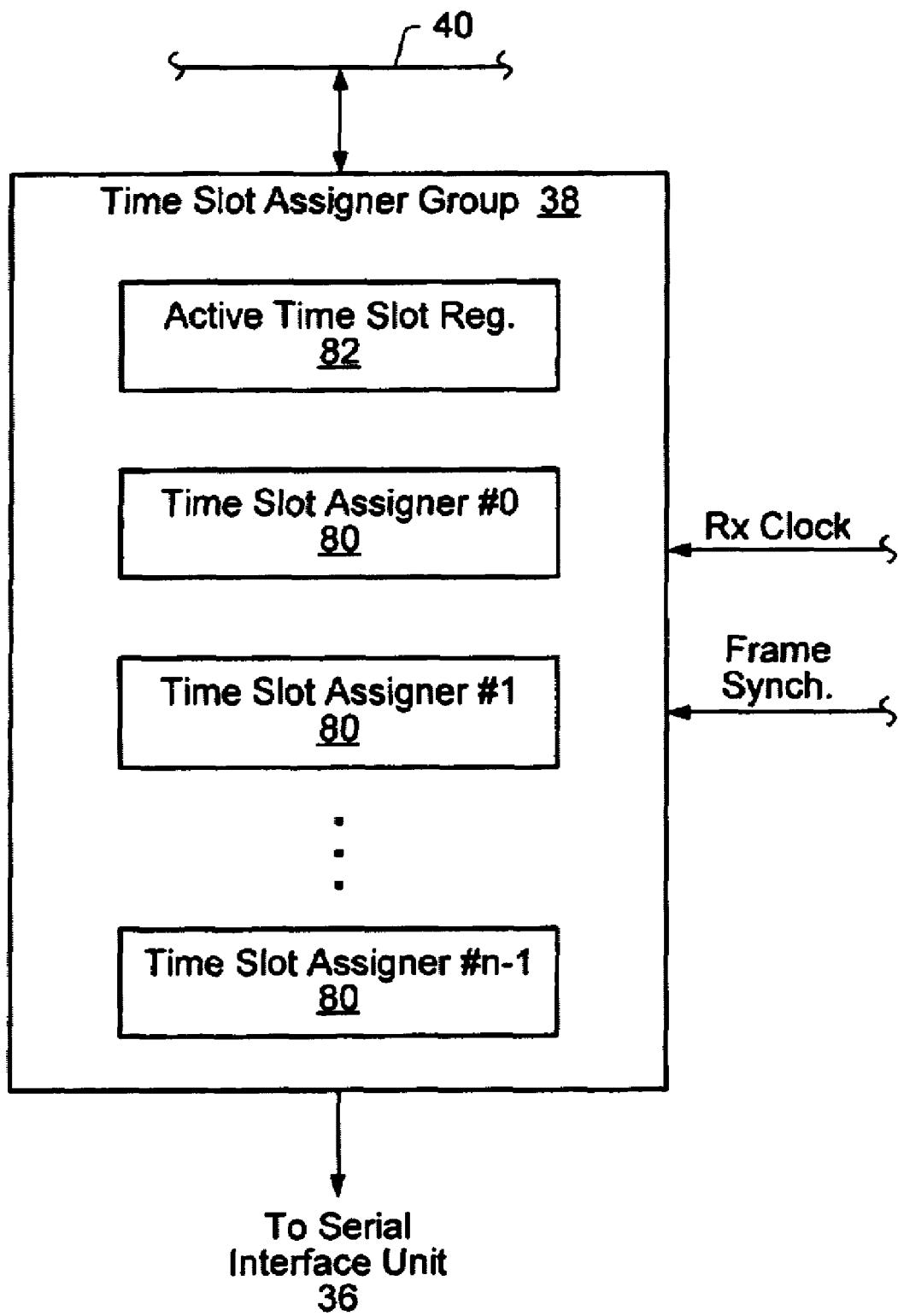
FIG. 9 is a block diagram of one embodiment of the time slot assigner group of FIG. 3, wherein the time slot assigner group includes clocking logic which is synchronized to the periodically recurring time slots and keeps track of the active serial data channel, and wherein the time slot assigner group includes "n" time slot assigners each associated with a serial data channel of the serial data stream, and wherein n is the maximum number of serial data channels which the serial communication system can combine (i.e., "multiplex") and transmit or receive and separate (i.e., "demultiplex")
Figure 10:
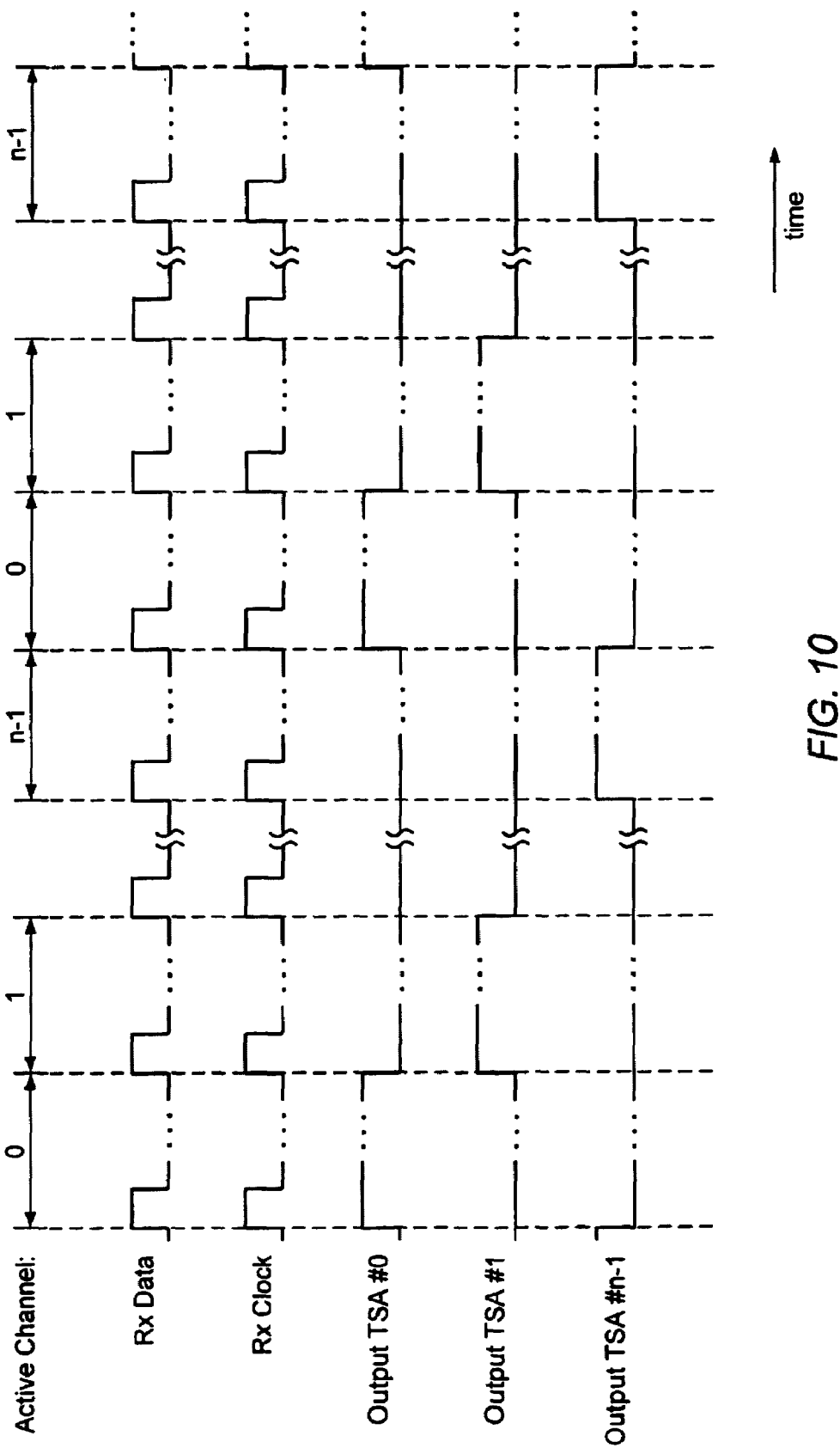
FIG. 10 is a graph of an "Rx Data" signal and an "Rx Clock" signal received by the serial communication controller of FIG. 3 versus time, along with output signals produced by each time slot assigner (TSA) within the time slot assigner group of FIG. 9, wherein each output signal is asserted during the time slot assigned to the corresponding serial data channel (i.e., when the corresponding serial data channel is active)

FIGS. 9 and 10 will now be used to describe the structure and function of one embodiment of time slot assigner group 38. FIG. 9 is a block diagram of the one embodiment of time slot assigner group 38. Time slot assigner group 38 includes "n" time slot assigners 80, where n is the maximum number of time division multiplexed serial data channels which serial communication system 10 can combine (i.e., "multiplex") and transmit or receive and separate (i.e., "demultiplex"). The n time slot assigners 80 in FIG. 9 are numbered '0' through 'n-1'. Each time slot assigner 80 is associated with a given serial data channel. FIG. 10 is a graph of the "Rx Data" signal, the "Rx Clock" signal, and the output signals produced by each time slot assigner (TSA) 80 within time slot assigner group 38 versus time. As shown in FIG. 10, each time slot assigner 80 produces an output signal which is asserted during the time slot assigned to the corresponding channel (i.e., when the corresponding channel is active).

Time slot assigners 80 use the "Rx Clock" and "Frame Synch" signals produced by timing recovery unit 20 to produce the output signals. In the embodiment of FIG. 9, time slot assigner group 38 also includes an active time slot register 82. The contents of active time slot register 82 are derived from the output signals of time slot assigners 80 and uniquely identify the active serial data channel. Microcontroller 42 may read active time slot register via main bus 40 to determine the active data channel. In other embodiments, time slot assigner group 38 may produce an output signal derived from the output signals of time slot assigners 80, wherein the output signal of time slot assigner group 38 uniquely identifies the active serial data channel. Time slot assigner group 38 may drive the output signal upon one or more signal lines of main bus 40.

When time slot assigner group 38 includes active time slot register 82 and microcontroller 42 reads active time slot register 82 via main bus 40 to determine the active serial data channel, time slot assigner group 38 may be coupled to serial interface unit 36 as shown in FIGS. 3 and 9 in order to prevent missed serial data bits in the receive mode. Time slot assigner group 38 may issue control signals to a shift register within serial interface unit 36 to enable "Rx Data" serial bit latching when the active serial data channel changes and before microcontroller 42 reads active time slot register 82.

Figure 11:
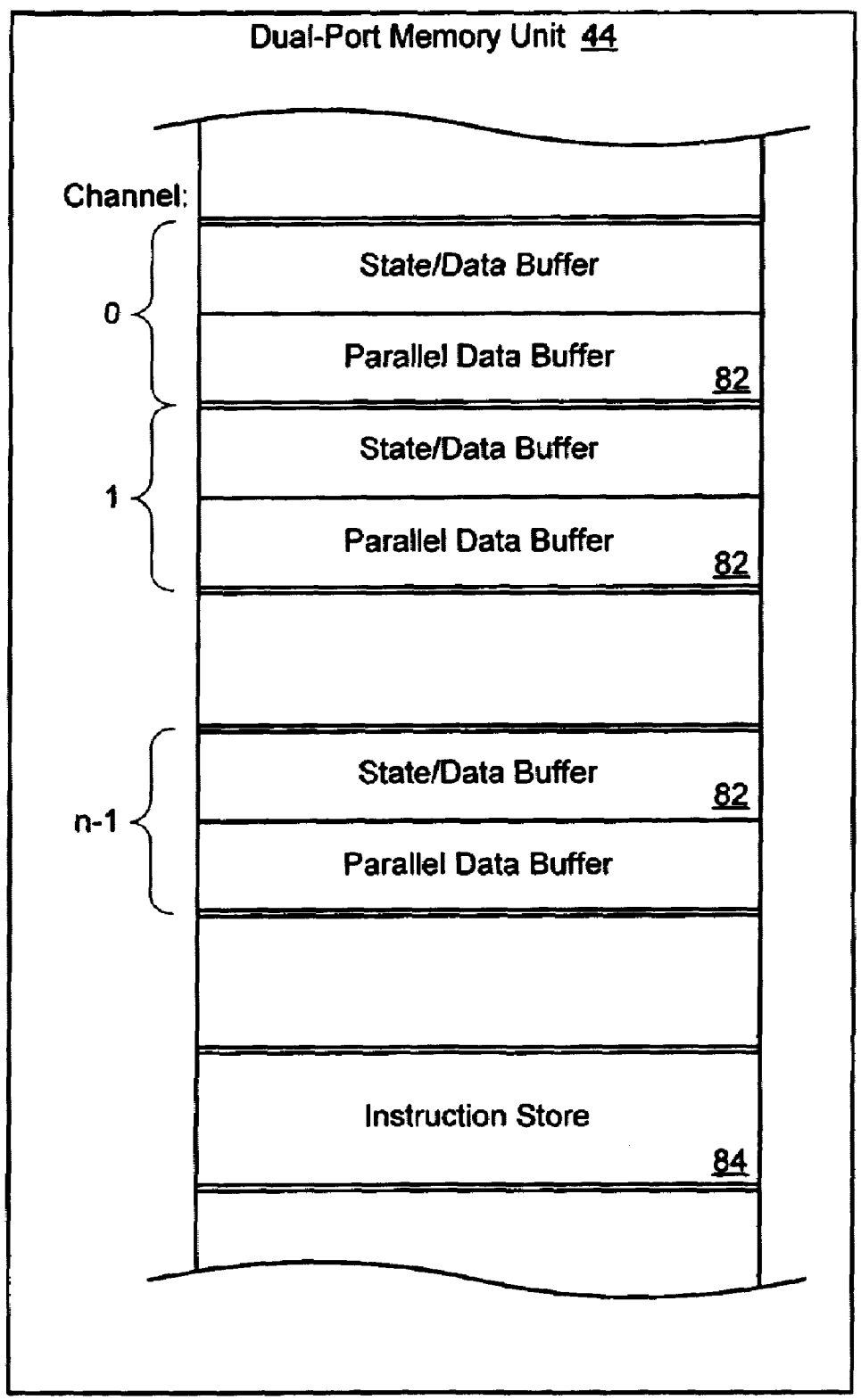
FIG. 11 is a block diagram of one embodiment of allocations of memory locations within the dual-port memory unit of FIG. 3, wherein each of the n serial data channels is allocated a channel data block within the dual-port memory unit, and wherein each channel data block includes a state/data buffer portion and a parallel data buffer portion, and wherein the state/data buffer portion is used to temporarily store the contents of the programmable registers of the functional units when the corresponding data channel is not active, and wherein the parallel data buffer is used to store parallel data to be transmitted and/or parallel data received via the corresponding serial data channel.

FIG. 11 is a block diagram of one embodiment of allocations of memory locations within dual-port memory unit 44. As shown in FIG. 11, each of the n time division multiplexed serial data channels handled by serial communication system 10 is allocated a channel data block 82 within dual-port memory unit 44. Each channel data block 82 includes a state/data buffer portion and a parallel data buffer portion. The state/data buffer portion is used to temporarily store the contents of the state and data registers of the functional units when the corresponding data channel is not active. The parallel data buffer is used to store data in parallel form to be transmitted and/or parallel data received via the corresponding channel. Dual-port memory unit 44 also includes an instruction store block 84 used to store instructions fetched and executed by microcontroller 42.

Host processor 12 initializes the operations of serial communication controller 16 by writing selected instructions to instruction store block 84 within dual-port memory system 44 via host processor interface 46, then issuing a control signal to microcontroller 42 which causes microcontroller 42 to begin fetching and executing the instructions. The selected instructions configure serial communication controller 16 to handle m serial data channels within a time division multiplexed serial data stream, where m is greater than or equal to 1 and less than or equal to n.

Serial communication controller 16 operates by using the functional units to alternately processes the active serial data channel within the serial data stream. As described above, Microcontroller 42 may read active time slot register 82 (FIG. 9) in order to determine the active serial data channel. Alternately, microcontroller 42 may receive a signal from time slot assigner group 38 via main bus 40 which uniquely identifies the active serial data channel.

When the active serial data channel changes from a first data channel to a second data channel, microcontroller 42 may issue a control signal to each functional unit which halts the operations of the functional units. Alternately, time slot assigner group 38 may issue a control signal to each functional unit via main bus 40 which halts the operations of the functional units. Microcontroller 42 may then save the state information of the functional units associated with the first data channel. Microcontroller 42 may accomplish this "state saving" activity by reading the contents of (i.e., state information within) remainder register 60 of CRC calculation unit 30, then storing the contents in a designated portion of the state/data buffer of the channel data block assigned to the first channel within dual-port memory unit 44. Microcontroller 42 may similarly read and store the contents of "data in" register 62 of CRC calculation unit 30; "data in" register 64, state register 66, and "data out" register 68 of zero bit insertion unit 32; "data in" register 70 and state register 72 of flag detection unit 34; and "parallel data" register 74 and state register 75 of serial interface unit 36.

Microcontroller 42 then restores the state information of the functional units associated with the second data channel. Microcontroller 42 accomplished this "state restoring" activity by reading the stored contents of remainder register 60 of CRC calculation unit 30 from the designated portion of the state/data buffer portion of the channel data block assigned to the second channel within dual-port memory unit 44, and storing the contents in remainder register 60 of CRC calculation unit 30. Microcontroller 42 similarly reads and stores the contents of "data in" register 62 of CRC calculation unit 30; "data in" register 64, state register 66, and "data out" register 68 of zero bit insertion unit 32; "data in" register 70 and state register 72 of flag detection unit 34; and "parallel data" register 74 and state register 75 of serial interface unit 36. Microcontroller 42 may then issue a control signal to each functional unit which restarts the operations of the functional units, completing the processing switch from the first data channel to the second data channel. Alternately, time slot assigner group 38 may issue a control signal to each functional unit via main bus 40 which restarts the operations of the functional units. The above process is repeated in sequence for all of the serial data channels within the serial data stream.

It will be appreciated by those skilled in the art having the benefit of this disclosure that this invention is believed to be a system and method for digital communication via a time division multiplexed serial data stream. Furthermore, it is also to be understood that the form of the invention shown and described is to be taken as exemplary, presently preferred embodiments. Various modifications and changes may be made without departing from the spirit and scope of the invention as set forth in the claims. It is intended that the following claims be interpreted to embrace all such modifications and changes.

What is claimed is:

1. A serial communication controller for transmitting and receiving a serial data stream including multiple serial data channels having portions which alternate in time with respect to each other, comprising:
   a plurality of functional units configured to operate in series according to a serial communication protocol, wherein each functional unit is configured to perform a different specific function of said serial communication protocol, and wherein the plurality of functional units operates in time sequence upon the portions of the multiple serial data channels;
   wherein the plurality of functional units is configured to perform said serial communication protocol on the multiple serial data channels; and
   wherein each functional unit is a state machine having a set of unique operating states, and wherein each functional unit comprises a set of memory elements, and wherein state information stored within the set of memory elements of a given functional unit determines the one of the unique operating states in which the functional unit is operating.

2. The serial communication controller as recited in claim 1, wherein the serial data stream includes digital data of only one of the multiple serial data channels at any given time, and wherein each of the multiple serial data channels is assigned a periodically recurring time segment and is active during its assigned time segment, and wherein the plurality of functional units operates upon the active serial data channel.

3. The serial communication controller as recited in claim 1, further comprising a memory unit operably coupled to each of the plurality of functional units, wherein the memory unit includes a separate portion allocated to each of the multiple serial data channels for storing the state information of the functional units.

4. The serial communication controller as recited in claim 3, further comprising a microcontroller coupled to each of the plurality of functional units and to the memory unit, wherein the microcontroller transfers state information between the functional units and the memory unit such that the plurality of functional units operates alternately upon the portions of the multiple serial data channels.

5. A serial communication controller for transmitting and receiving a serial data stream including alternating portions of multiple serial data channels, comprising:
   a plurality of functional units each configured to perform a specific function of a serial communication protocol, wherein each functional unit is a state machine having a set of unique operating states, and wherein each functional unit comprises a programmable state register, and wherein state information stored within the state register of a given functional unit determines the one of the unique operating states in which the functional unit is operating;
   a memory unit including a separate portion allocated to each of the multiple serial data channels for storing the state information of the functional units; and
   a microcontroller coupled to each of the plurality of functional units and to the memory unit, wherein the microcontroller is configured to transfer state information between the plurality of functional units and the memory unit such that the plurality of functional units operates alternately upon the portions of the multiple serial data channels;
   wherein different state information is transferred for each serial data channel depending on which serial data channel's portion is being operated on by the plurality of functional units.

6. The serial communication controller as recited in claim 5, further comprising a time slot assigner group coupled to the microcontroller, wherein the time slot assigner group includes clocking circuitry and keeps track of which of the multiple serial data channels is active.

7. The serial communication controller as recited in claim 6, wherein the time slot assigner group produces an output signal indicating which of the multiple serial data channels is active, wherein the microcontroller receives the output signal and performs the state information transfers in response to the output signal.

8. The serial communication controller as recited in claim 6, wherein the time slot assigner group includes an active time slot register, and wherein the contents of the active time slot register indicate which of the multiple serial data channels is active, and wherein the microcontroller reads the active time slot register and performs the state information transfers dependent upon the contents of the active time slot register.

9. The serial communication controller as recited in claim 6, wherein the plurality of functional units, the memory unit, the microcontroller, and the time slot assigner group are formed upon a single monolithic semiconductor substrate.

10. A method for transmitting and receiving a serial data stream including alternating portions of multiple serial data channels, comprising:
   providing a plurality of functional units each configured to perform a specific function of a serial communication protocol upon the portions of the multiple serial data channels, wherein each functional unit is a state machine having a set of unique operating states, and wherein state information stored within a given functional unit determines the one of the unique operating states in which the functional unit is operating; and
   transferring state information between the plurality of functional units and a memory unit such that the plurality of functional units operates alternately upon the portions of the multiple serial data channels;
   wherein different state information is transferred for each serial data channel depending on which serial data channel's portion is being operated on by the plurality of functional units.

11. The method as recited in claim 10, wherein the transferring comprises:
   determining a change in the active serial data channel from a first serial data channel to a second data channel; and
   responding to the change in the active serial data channel by:
      retrieving the state information within each functional unit;
      storing the retrieved state information within in a portion of the memory unit allocated to the first data channel;
      retrieving state information from a portion of the memory unit allocated to the second data channel; and
      storing the retrieved state information within each functional unit.

12. The method as recited in claim 11, wherein the alternating portions of the multiple serial data channels are periodically recurring, and wherein the determining comprises synchronizing clocking circuitry to the periodically recurring portions of the multiple serial data channels.

13. A serial communication system, comprising:
   an interface unit adapted for coupling to a transmission medium, wherein the interface unit is configured to receive a receive serial data stream including alternating portions of multiple serial data channels from the transmission medium and to provide the receive serial data stream to a timing recovery unit;
   the timing recovery unit coupled to receive the receive serial data stream from the interface unit, wherein the timing recovery unit is configured to produce a clock signal derived from the receive serial data stream and to provide the receive serial data stream and the clock signal to a serial communication controller; and
   the serial communication controller coupled to receive the clock signal and the receive serial data stream, wherein the serial communication controller comprises a plurality of functional units configured to operate in series according to a serial communication protocol, and wherein each functional unit is configured to perform a different specific function of said serial communication protocol, and wherein the plurality of functional units operates alternately upon the portions of the multiple serial data channels of the receive serial data stream to perform said serial communication protocol on the multiple serial data channels.

14. The serial communication system as recited in claim 13, wherein the serial communication controller is further configured to produce a transmit serial data stream including alternating portions of multiple serial data channels, and wherein the interface unit is coupled to receive the transmit serial data stream and further configure to drive the transmit serial data stream upon the transmission medium.

15. The serial communication system as recited in claim 13, wherein the serial communication controller is adapted for coupling to a host processor.

* * * * *